United States Patent Office

3,652,718
Patented Mar. 28, 1972

3,652,718
CURING OF POLYESTER COMPOSITIONS
Shoshana Abrahami, Beersheba, Aharon Molcho, Rehovot, and Reuven (Roman) Wachs, Beersheba, Israel, assignors to Makhteshim Chemical Works Ltd., Beersheba, Israel
No Drawing. Continuation-in-part of application Ser. No. 856,871, June 26, 1969, which is a division of application Ser. No. 558,627, June 20, 1966. This application Jan. 13, 1971, Ser. No. 106,288
Int. Cl. C08f 21/02
U.S. Cl. 260—863
6 Claims

ABSTRACT OF THE DISCLOSURE

Uncured polyester-accelerator compositions. The compositions contain unsaturated polyester resin, water and a vanadium accelerator obtained by dissolving vanadium compound oxide in concentrated aqueous hydrochloric acid and admixing to the resulting solution an alkyl ester of phosphorous acid. There is also provided a method of curing unsaturated polyester resin wherein said resin is admixed with water and said vanadium accelerator and an organic peroxide.

---

This is a continuation-in-part of our patent application No. 856,871 filed June 26, 1969, and now abandoned, which was divided out from our patent application No. 558,627 filed June 20, 1966, now Pat. No. 3,480,561.

The present invention concerns uncured unsaturated polyester compositions.

Unsaturated polyester compositions are commercial products comprising poly-condensation products of di- or polybasic acids or anhydrides with di- or polyhydroxy alcohols with one of the reactants having non-aromatic unsaturation, and an unsaturated monomer capable of polymerizing with the unsaturated polyester.

Unsaturated polyester resins forming constituent parts of uncured compositions according to the present invention are, for instance, polyesters as they are obtained by esterifying preferably ethylenically unsaturated di- or polycarboxylic acids or their anhydrides, such as maleic acid, fumaric acid, glutaconic acid, itaconic acid, mesaconic acid, citraconic acid, allyl malonic acid, allyl succinic acid, and others with saturated or unsaturated polyalcohols such as ethylene glycol; diethylene glycol (2,2'-dihydroxy ethyl ether); triethylene glycol [ethylene glycol bis-(2-hydroxy ethyl ether)]; propanediol-1,2; butanediol-1,3; 2,2-dimethyl propanediol-1,3; butene(2)-diol-1,4; glycerol; pentaerythritol; mannitol; trimethyl pentanediol; cyclohexane dimethanol; 2,2',4-trimethyl pentanediol; 2,2',4,4'-tetramethyl cyclobutanediol; 4,4'-isopropylidene-discyclohexanol; bis phenols such as 4,4'-isopropylidene bisphenol and chloro and bromo derivatives thereof; and others.

The polyester may result from the esterification of a mixture of two or more of the above acids with two or more of the above polyalcohols. Furthermore, the unsaturated di- or polycarboxylic acids in the starting material may be replaced, at least partly, by saturated carboxylic acids or anhydrides such as adipic acid, succinic acid, sebacic acid, azelaic acid, cyclohexane dicarboxylic acids, and others, or by aromatic dicarboxylic or polycarboxylic acids or anhydrides, such as phthalic acid, isophthalic acid, tetrachlorophthalic acid, 1,4,5,6,7,7-hexachloro bicyclo (2,2,1) heptene(5)-2,3-dicarboxylic acid, tetrabromo phthalic acid, trimellitic anhydride, pyromellitic anhydride, chlorendic acid, hexachloro-octahydro methano naphthalene dicarboxylic acid, methyl nadic anhydride and others.

The other component of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, $\alpha$-methyl styrene, divinyl benzene, methyl acrylate, the diallyl maleate, diacetone acrylamide, halogenated styrene such as chlorostyrene, bromo styrene and others, which are copolymerizable with said polyesters.

For the production or coating of articles with polyester the non-cured composition is applied and is cured in situ. During the curing the unsaturated monomer reacts with the poly-condensation product, presumably by being grafted thereon and/or by the formation of cross-links between the chains. This reaction has to be catalyzed and, where it is carried out at room temperature or only at a slightly elevated temperature an accelerator has to be used as well.

Conventionally various peroxides and hydroperoxides are used as catalysts.

Examples of suitable catalysts are benzoyl peroxide, chlorobenzoyl peroxide, lauroyl peroxide, caprylyl peroxide, 1-hydroxycyclohexyl hydroperoxide-1 and methyl ethyl ketone peroxide cumene hydroperoxide, tertiary butyl hydroperoxide, 2,5-dimethyl - 2,5 - dihydroperoxy hexane, diacetyl peroxide, benzoyl peroxide, lauroyl peroxide, methyl isobutyl ketone peroxide, trimeric acetone peroxide, or cyclohexanone peroxide, tertiary butyl perbenzoate, tertiary butyl permaleic acid ester, tertiary butyl perphthalate, tertiary butyl per($\alpha$-ethyl)-hexanoate, peresters of 2,5-dimethyl-2,5-dihydroperoxy hexane and formic acid or acetic acid and others.

The accelerators conventionally used comprise a variety of metal compounds such as of cobalt, manganese, lead, zinc and iron. Examples of such compounds are cobalt naphthenate, manganese naphthenate, cobalt octoate.

It has also already been proposed to use as accelerators various vanadium compounds. Thus in German patent specification No. 1,070,819 there is described the use of such vanadium compounds as vanadyl-p-toluene sulphonate, vanadylacetate, vanadyloctoate and vanadylacetylacetate. In British patent specification No. 840,021 there is described the use of pentavalent vanadium compounds in combination with benzene phosphinic acid as accelerators. As vanadium compounds that can be used there are mentioned specifically vanadium naphthenate, vanadyl hexamethyl tetramine, vanadyl 8-hydroxyquinolinate, vanadyl diethyldithiocarbamate, vanadium tetramandelate, vanadyl disalicylal ethylenediimine, vanadyl disalicylal ethylenediimine monopyridinate and others. Yet another type of vanadium accelerators is described in U.S.A. patent specification No. 3,238,274 being solutions of vanadium compounds in a liquid acid phosphate ester. The vanadium compounds may be organic salts such as vanadium naphthenate or inorganic salts such as ammonium vanadate. Particularly preferred in accordance with the disclosure in the above patent specification is vanadium oxide. Examples of acid phosphate esters to be used in accordance with the U.S.A. patent are dibutyl hydrogen phosphate, diethyl hydrogen phosphate, dinonyl hydrogen phosphate, diisooctyl hydrogen phosphate, di-N-octyl hydrogen phosphate, dimethyl hydrogen phosphate and others.

The use of vanadium compounds as accelerators has aroused considerable interest as it appears that these are superior to compounds of other metals. However, vanadium compounds that have so far been known to be applicable as accelerators in the curing of polyester compositions are not quite satisfactory in various respects such as undesirable discolouring of the cured polyester, the requirement of relatively large quantities, lack of stability, unsatisfactory pot life when admixed without the catalyst to the polyester compositions and the like. The insufficient pot life is in particular a serious drawback since consumers prefer to receive the polyester compositions with the accelerator already readily admixed thereto.

It follows from the literature and has also been confirmed by investigations conducted in accordance with the present invention that the effectiveness of a certain accelerator depends both on the nature of the metal and of the non-metallic components of the compound. It follows, therefore, that various degrees of effectiveness can be obtained with different vanadium compounds. It is the object of the present invention to provide improved accelerators for the curing of polyester compositions selected from among the class of vanadium compounds.

The invention consists in uncured polyester-accelerator compositions wherein the accelerator is a composition consisting essentially of water and a vanadium compound obtained by dissolving vanadium pentoxide ($V_2O_5$) in concentrated aqueous hydrochloric acid and admixing to the resulting solution an alkyl ester of phosphorous acid.

The dissolution of the $V_2O_5$ in HCl is preferably conducted at elevated temperature, e.g. at about 100° C. Optionally, a water soluble bisulfite salt may be added before the addition of the phosphorous ester, which reduces still further any discolouring effect of the final composition.

The chemical nature of the above accelerator compositions is not fully established. At any rate it would appear that the resulting vanadium compounds contain chlorine as well as phosphorous ester groups.

Suitable esters of phosphorous acid which can be employed in the preparation of the accelerators may be represented by the formula

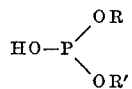

where R represents an alkyl group having from 1 to 8 carbon atoms, and R' represents an alkyl group having from 1 to 8 carbon atoms or hydrogen. Representative esters of phosphorous acid are dimethyl hydrogen phosphite, diethyl hydrogen phosphite, dipropyl hydrogen phosphite, dibutyl hydrogen phosphite, dioctyl hydrogen phosphite, diphenyl hydrogen phosphite, mono-methyl hydrogen phosphite, ethyl hydrogen phosphite, butyl hydrogen phosphite, mixed mono-ethyl mono-phenyl hydrogen phosphite, and diphenyl phosphite. Mixtures of esters of phosphorous acid may also be used. The preferred esters are the lower alkyl esters of phosphorous acid and most preferred is dimethyl hydrogen phosphite.

Examples of water soluble bisulfite salts are sodium bisulfite, potassium bisulfite, ammonium bisulfite and calcium bisulfite. For economic reasons sodium bisulfite is preferred.

The accelerators employed in the uncured polyester composition according to the invention have been found to be superior to known accelerators including the vanadium compounds according to U.S.A. patent specification No. 3,238,274 referred to above. This superiority is expressed both in terms of smaller quantities required for admixture to a given quantity of a given polyester composition to produce a ready mixed uncured polyester composition, a weaker discolouring effect, if any, greater stability, shorter gel time and a longer pot life of ready made mixtures of the polyester compositions according to the invention brought about, as a rule, by stabilization with minute quantities of a copper salt such as copper naphthenate, or copper octoate.

The invention also consists in a process for curing an unsaturated polyester composition wherein an organic peroxide, hydroperoxide, perester or peroxyacetal compound is used as catalyst and the accelerator is a composition obtained by reacting vanadium pentoxide with concentrated aqueous hydrochloric acid, optionally adding a water soluble bisulfite salt to the solution and admixing the resulting solution with an ester of phosphorous acid.

The quantity of peroxidic, hydroperoxidic, perester or peroxyacetal catalyst employed in curing the unsaturated polyester resin compositions of the invention is well established in the art and ranges between 0.1 to 4% by weight of the polymerizable material.

The amount of vanadium-phosphorous acid ester accelerator which can be added to the unsaturated polyester composition may vary. As a rule it is desirable to use the least quantity needed to give a suitable cure. Generally amounts of the vanadium in the accelerator are in the range of 0.0005% to 0.025% by weight of polymerizable material, preferably in the range of 0.002% to 0.01% by weight of polymerizable material.

The vanadium-phosphorous acid ester can also be used in combination with other known accelerators such as cobalt, manganese, lead, zinc and iron salts of organic acids, primarily naphthenate and octoate salts. Particularly effective is the combination of vanadium-phosphorous acid ester accelerator and cobalt naphthenate or cobalt octoate.

When the vanadium accelerator of our invention is used in combination with cobalt salts the ratio of the two is in the range of from 1:10 to 10:1 on a weight for weight basis, preferably in the ratio of from 5:1 to 1:1.

The invention is illustrated by the following examples without being limited thereto:

EXAMPLE 1

1 g. of $V_2O_5$ was added to 25 cc. of 35% aqueous hydrochloric acid while stirring and heating to 100° C. After almost complete dissolution, undissolved matter was filtered off and to the filtrate was added 86 cc. of dimethyl hydrogen phosphite.

An unsaturated polyester resin was prepared in a conventional manner by heating a mixture of 25 parts by weight maleic acid anhydride, 25 parts by weight of phthalic acid anhydride, 55 parts by weight of propylene glycol and 0.013 part by weight of hydroquinone acting as inhibitor. The process was carried out under a $CO_2$ atmosphere at 205° C. for 7–8 hours. 70 parts by weight of the resulting resin was admixed with 30 parts by weight of styrene.

100 g. of the above composition was cured by adding thereto 50 p.p.m. of the above vanadium composition and 2% by weight of methyl-ethyl ketone peroxide. After 5 minutes at 30° C. the compositions congealed.

EXAMPLE 2

1 g. of $V_2O_5$ was added to 25 cc. of 35% aqueous hydrochloric acid and the reaction mixture was kept at 100° C. while stirring. After almost complete dissolution 4 g. of sodium bisulfite was added, the reaction mixture was cooled, undissolved matter was filtered off and from the filtrate some of the water was removed by distillation. Thereafter 80 cc. of triethyl phosphite was added.

To 100 g. of the same polyester composition used in Example 1 there was added 50 p.p.m. of the above vanadium composition and 2% by weight of cyclohexanone peroxide. The composition congealed after 7 minutes at 30° C.

EXAMPLE 3

To 1 cc. of the accelerator composition prepared in accordance with Example 2 was added 0.01% by weight of a 6% aqueous copper naphthenate solution and the mixture was thoroughly stirred.

To four 100 cc. portions of the polyester composition used in Example 1 were added 50 p.p.m. of the above stabilized accelerator composition. The resulting polyester-accelerator mixtures were left to stand for different times, thereafter admixed with 2% by weight of cumene hydroperoxide and the times of gelation at 25° C. were measured. The results obtained were as follows:

| Time [1]: | Time of gelation, mins. |
|---|---|
| Immediately | 15 |
| One month | 18 |
| Two months | 20 |
| Three months | 20.5 |

[1] After which catalyst was added.

It is thus seen that the effect of the stabilizer is that it slows down somewhat the time of gelation as compared to an unstabilized accelerator composition but against this enables the prolonged storage of a polyester/accelerator composition without any substantial prolongation of the gelatine time.

Test No. 1 shows clearly that phosphite-based accelerator according to the invetnion are superior and not equivalent to phosphate based vanadium accelerator. The composition containing accelerator No. 1 of the invention gelled twice as fast as the composition containing an analogous accelerator in which dimethylphosphate was substituted for dimethylphosphite. After 30 minutes, the composition cured with the inventive accelerator had a Barcol hardness of 30/30 whereas the vanadium phosphate accelerator was still tacky.

(d) Tests 2–4

Unsaturated polyester compositions were cured with vanadium-phosphite accelerators using various organic peroxide curing catalysts.

| Formulation | Test 2 | Contr. B | Test 3 | Contr. C | Test 4 | Contr. D |
|---|---|---|---|---|---|---|
| Polyester resin, g | 50 | 50 | 50 | 50 | 50 | 50 |
| Methylethylketoneperoxide, ml.[1] | 1.0 | 1.0 | | | | |
| Cyclohexanoneperoxide [3] | | | 0.5 | 0.5 | | |
| Cumenehydroperoxide [4] | | | | | 0.5 | 0.5 |
| Accelerator No. 1, ml | 0.2 | | 0.2 | | 0.2 | |
| Accelerator No. 3, ml | | 0.5 | | 0.5 | | 0.5 |
| Gel time at 25° C., min | 9½ | 55 | 13 | 120 | 13 | 14 |
| 30 minute Barcol Hardness [2] | 30/30 | Not gelled | 25/30 | Not gelled | 25/30 | 25/30 |

[1] Butanox M–50 by Noury van der Lande containing 9% active oxygen.
[2] ASTM Test No. D2583–67.
[3] Active oxygen content 7.4%.
[4] Trigonox K–70 by Noury van der Lande containing 7.35% active oxygen.

EXAMPLE 4

In the following Example 4 some comparative tests are given showing the superiority of the present invention over the prior art.

(a) Preparation of accelerators

*Vanadium stock solution.*—16.0 g. $V_2O_5$ were dissolved in 80.0 ml. 35% aqueous hydrochloric acid at 100° C. 16.0 g. sodium bisulfite was added with stirring and the solution was filtered. The solution contained 9.1% vanadium.

*Accelerator No. 1 (according to the invention).*—To 5.0 ml. of vanadium stock solution was added 9.0 ml. water and 85.0 ml. dimethylphosphite to give a vanadium-dimethylphosphite accelerator solution containing 0.5% vanadium.

*Accelerator No. 2.*—To 5.0 ml. of vanadium stock solution was added 9.0 ml. water and 85.0 ml. dimethylphosphate to give a solution containing 0.5% vanadium. This accelerator differs from the one according to the invention in that it is based on phosphate.

*Accelerator No. 3.*—0.36 g. $V_2O_5$ was dissolved in 100 g. diethylphosphite by heating at 120° C. for 3 hours. The solution contains 0.2% vanadium. This accelerator differs from the one according to the invention in that the $V_2O_5$ was not first reacted with aqueous HCl.

*Accelerator No. 4.*—0.36 g. $V_2O_5$ was dissolved in 100 g. dimethylphosphate by heating at 120° C. The solution contains 0.2% vanadium. This accelerator differs from the one according to the invention in that it is based on phosphate and the $V_2O_5$ was not first reacted with aqueous HCl.

(b) Polyester resin

An unsaturated polyester resin was prepared by reacting 1 part of maleic anhydride and 1 part of phthalic anhydride with 2.2 parts of propylene glycol at 205° C. under inert atmosphere. 70 parts of this resin was mixed with 30 parts of styrene to give an unsaturated polyester resin composition.

(c) Test No. 1

| Formulation | Test 1 | Control A |
|---|---|---|
| Polyester resin, g | 50 | 50 |
| Methylethylketoneperoxide, ml.[1] | 1. | 1. |
| Accelerator No. 1 | 0.25 | |
| Accelerator No. 2 | | 0.25 |
| Gel time at 25° C., min | 7 | 14 |
| 30 min. Barcol Hardness [2] | 30/30 | Tacky |

[1] Butanox M–50 by Noury van der Lande containing 9% active oxygen
[2] ASTM Test No. D2583–67.

Tests 2–3 clearly show the superiority of the inventive accelerator when compared with a simple solution of vanadium pentoxide in diethylphosphite. The accelerator when prepared according to the invention is effective in accelerating the cure of unsaturated polyester resins with all the peroxide catalysts tested, i.e.: MEKP, cyclohexanoneperoxide and cumene hydroperoxide. The control, accelerator No. 3 which contains vanadium pentoxide dissolved in diethylphosphite but not in accordance with the invention, only accelerated a cure with cumene hydroperoxide and not with the other two peroxide catalysts.

(e) Test No. 5

Unsaturated polyester compositions were cured with the following accelerators.

| Formulation | Test 5 | Control E |
|---|---|---|
| Polyester resin, g | 50 | 50 |
| Methylethylketoneperoxide, ml.[1] | 1.0 | 1.0 |
| Accelerator No. 1, ml | 1.0 | |
| Accelerator No. 4, ml | | 1.0 |
| Gel time at 25° C., min | 9½ | 13 |

[1] Butanox M–50 by Noury van der Lande containing 9% active oxygen.

Test 5 shows that the accelerator of the invention effects a faster gelling than a solution of $V_2O_5$ dimethyl phosphate using MEKP as curing catalyst.

EXAMPLE 5

Commercially available unsaturated polyester sold under the trade name Crystic 197 by Scott-Bader, based on bis-phenol A containing styrene monomer was cured using a vanadium accelerator according to the invention. The resulting data is tabulated in Table 1.

EXAMPLE 6

Commercially available unsaturated polyester, Hetron 92, based on HET-acid containing 33% styrene monomer was cured using a vanadium accelerator according to the invention. The results are tabulated in Table 1.

EXAMPLE 7

An unsaturated polyester composition based on the reaction product of 0.5 mole phthalic anhydride, 0.5 mole maleic anhydride and 1.05 moles neopentylglycol containing 33% styrene monomer was cured with a vanadium accelerator according to the invention. The results are tabulated in Table 1.

TABLE 1

| Formulation | Ex. 5 | Ex. 6 | Ex. 7 |
|---|---|---|---|
| Polyester resin, g | 50 | 50 | 50 |
| Cumene hydroperoxide, ml.[1] | 0.5 | | 0.5 |
| Methylethylketoneperoxide, ml.[2] | | 0.5 | |
| Accelerator No. 1, ml.[3] | 0.25 | 0.25 | 0.25 |
| Gel time (mins.) at 18° C | 28 | 24 | 21 |
| Time to Barcol Hardness of 40, mins.[4] | 90 | 75 | 60 |

[1] Active oxygen 7.35%.
[2] Active oxygen 9.0%.
[3] As described for Example 4.
[4] ASTM Test No. D2583-67.

EXAMPLE 8

A commercially available unsaturated polyester resin, Laminac 4134, based on adipic acid, fumaric acid and diethylene glycol, was blended with styrene monomer in a ratio of 2:1 and cured at 26° C. with 0.5% cumene hydroperoxide having an active oxygen content of 7.35% and 0.25% vanadium acceleration No. 1. The composition gelled in 30 minutes and upon complete cure gave a rubbery material easily removable from the mold.

EXAMPLES 9 AND 10

An unsaturated polyester resin composition was prepared by blending a polyester derived from the reaction of one mole isophthalic acid, three moles maleic anhydride and 4.3 moles propylene glycol with styrene monomer and one other poly unsaturated olefinic monomer and cured. The formulations and results are tabulated below.

| Formulation | Example 13 | Example 14 |
|---|---|---|
| Polyester resin | 60 | 60 |
| Styrene | 30 | 30 |
| Triallylcyanurate | 10 | |
| Diallylphthalate | | 10 |
| Cyclohexanone peroxide, ml.[1] | 1.0 | 1.0 |
| Vanadium accelerator No. 1, ml.[2] | 0.5 | 0.5 |
| Gel time (minutes) at 20° C | | |

[1] Containing 4.9% active oxygen.
[2] As prepared for Example 4.

Examples 9 and 10 demonstrate the effectiveness of the accelerator according to the invention in obtaining fast gelation with compositions that generally do not gel at room temperature with other accelerators.

EXAMPLE 11

A vanadium accelerator composition was prepared as follows:

1.14 ml. of vanadium stock solution as prepared for Example 4 was blended with 1.0 ml. cobalt octoate solution containing 10% cobalt, 17.0 ml. dimethyl phosphite and 3.06 ml. water.

The accelerator composition thus contained 0.5% vanadium, 0.45% cobalt and 15.0% water on a weight basis.

An unsaturated polyester composition prepared from 70 parts reaction product of 1 mole maleic anhydride, 1 mole phthalic anhydride and 2.1 moles propylene glycol and 30 parts styrene monomer was cured with 1.0 ml. cumene hydroperoxide (active oxygen content 7.4%) and 0.26 ml. vanadium-cobalt accelerator as prepared above. The composition gelled after 11 minutes at 25° C. and had a Barcol hardness (ASTM Test No. D2583-67) of 30/30 after only 30 minutes.

It should be noted that the polyester composition used in the foregoing examples was selected at random and that the invention is also applicable to any other unsaturated polyester composition. It should further be noted that the accelerator compositions are not confined to those obtained from the phosphorus acid esters described in the foregoing examples and that also compositions obtained by using the other phosphorous acid ester are suitable.

Likewise the nature of the catalyst is not critical and any organic peroxide, hydroperoxide perester or peroxyacetal that is conventionally used in the curing of polyester compositions can be applied in accordance with the invention.

What is claimed is:

1. An uncured polyester-accelerator composition, wherein the accelerator is a composition consisting essentially of water and a vanadium compound obtained by dissolving vanadium pentoxide in concentrated aqueous hydrochloric acid and admixing to the resulting solution an alkyl ester of phosphorous acid.

2. An uncured polyester-accelerator composition according to claim 1, wherein said accelerator composition also contains a minor amount, sufficient to inhibit discoloring, of a water soluble alkali metal bisulfite salt.

3. An uncured polyester-accelerator composition according to claim 2, wherein said alkali metal bisulfite salt is sodium bisulfite.

4. An uncured polyester-accelerator composition in accordance with claim 1, stabilized with a minor amount, sufficient to impart longer pot life, of an organic copper salt.

5. An uncured polyester composition in accordance with claim 1, wherein said alkyl ester of phosphorous acid is dimethyl phosphite.

6. An uncured polyester-accelerator composition, wherein the accelerator is a composition consisting essentially of water and a vanadium compound obtained by dissolving vanadium pentoxide in concentrated aqueous hydrochloric acid, adding to the resulting solution first sodium bisulfite and then admixing thereto dimethyl phosphite.

References Cited

UNITED STATES PATENTS

| 3,238,274 | 3/1966 | Allan. |
| 3,333,021 | 7/1967 | Geipert. |

FOREIGN PATENTS

| 6606661 | 1/1967 | Netherlands. |
| 1,081,344 | 8/1967 | Great Britain. |

MELVIN GOLDSTEIN, Primary Examiner

U.S. Cl. X.R.

252—429 R